Patented July 19, 1938

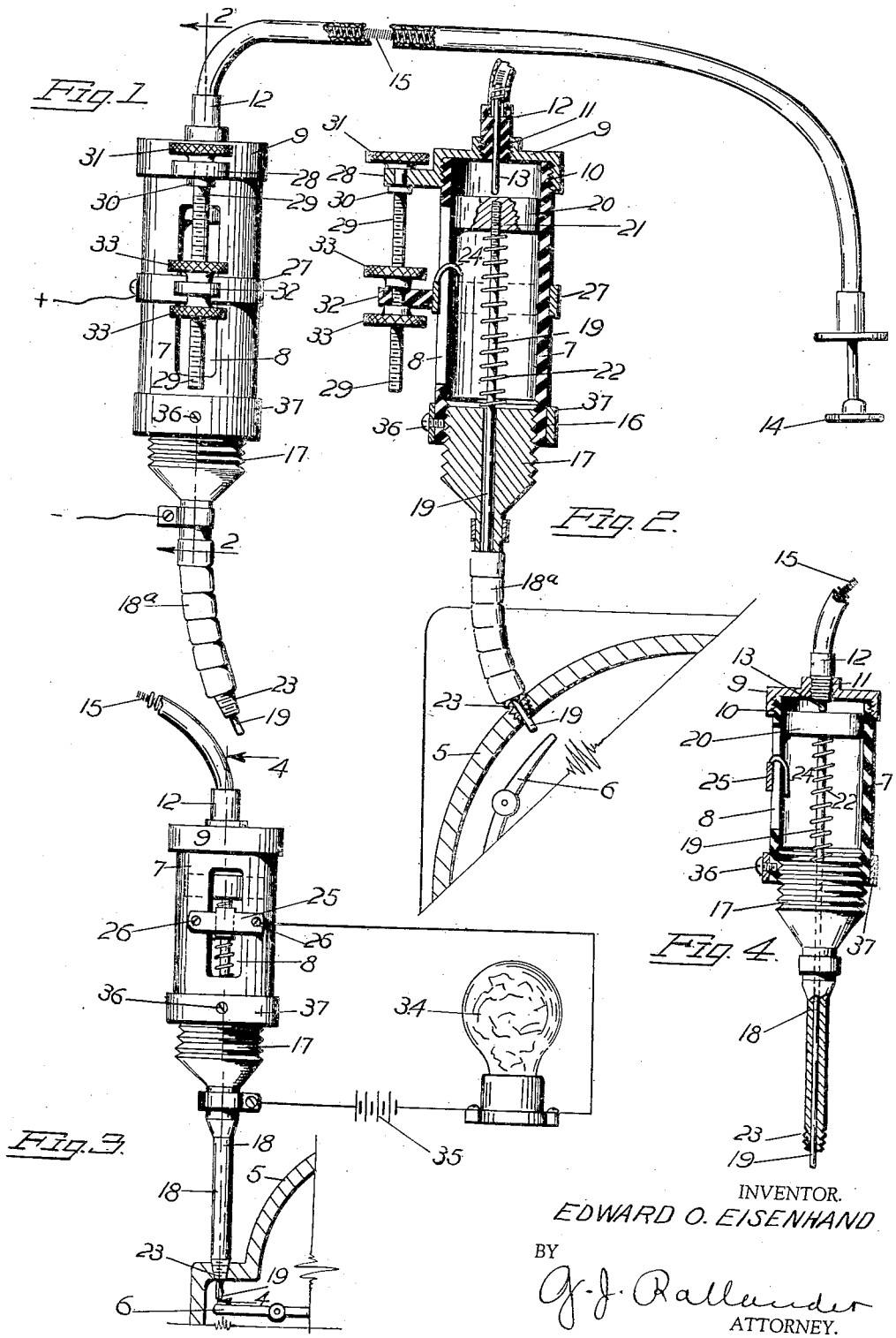

2,124,368

UNITED STATES PATENT OFFICE 2,124,368

FLASHLIGHT ATTACHMENT FOR CAMERAS

Edward O. Eisenhand, Denver, Colo.

Application May 14, 1935, Serial No. 21,313

2 Claims. (Cl. 67—29)

This invention relates to improvements in flash-light attachments for cameras and has reference more particularly to that type of device which operates the shutter and the flash-light in synchronism.

In the taking of "flash-light" pictures it is customary to employ, for illuminating the scene, a lamp that gives an instantaneous flash of great brilliancy, which is produced by the burning of a metal foil in an atmosphere of oxygen. The "flash" of light produced by such lamps lasts approximately one fiftieth (1/50) part of a second, and since the shutters of high speed cameras remain open only a fraction of a second, sometimes only one two-hundredth (1/200) part of a second, it is evident that very great care must be taken to synchronize the "flash" with the shutter as, for the best results, the "flash" should take place when the shutter is wide open.

The flash-lamps with which this invention is concerned are ignited by an electric current and there is always a short lag between the closing of the switch and the "flash" which must be taken into consideration in making adjustments to effect synchronous operation.

The shutters on the best cameras are spring operated, and after being set are held in set position by a trigger that must be moved to release them. The distance that the trigger must be moved varies slightly even in cameras of the same style and make, which requires another adjustment in the operating means.

It is the object of this invention to produce a flash-light switch and a shutter release mechanism of simple and substantial construction that can be substituted for the ordinary cable release, with which practically every camera is provided, and which in turn is controlled by the cable release that was originally used for operating the shutter.

Another object of this invention is to produce a flash-light control device which shall be so designed and constructed that adjustments can readily be made to obtain the synchronous operation of the shutter and the "flash."

The above and other objects that may become apparent as this description proceeds are attained by means of a construction and an arrangement of parts that will now be described in detail and for this purpose reference will be had to the accompanying drawing in which the preferred embodiment of the invention has been illustrated, and in which Figure 1 is a side elevation of the improved flash-light and shutter operating attachment;

Figure 2 is a section taken on line 2—2, Figure 1;

Figure 3 is a side elevation of a slightly modified form of the invention; and

Figure 4 is a section taken on line 4—4, Figure 3.

In the drawing reference numeral 5 designates the ordinary shutter frame or lens housing of a camera and numeral 6 designates the trigger which holds the shutter in "cocked" or set position against the action of a spring. Applicant has not illustrated the camera, but only the two parts thereof, above identified, as this is believed to be sufficient for applicant's purpose. The device is attached to a camera substantially as shown in Figure 4 of United States Letters Patent 1,996,592 issued April 2, 1935, to which reference can be had if necessary.

The device consists of a short tube 7 of insulating material, such as fiber or hard rubber, and which is provided with a longitudinal opening 8. The outer end of the tube is closed by a cap 9 which is preferably threaded onto the tube as indicated by reference numeral 10. The cap is provided with a centrally located, threaded opening 11 to which the cable release 12 is attached: this cable release is of the usual construction and has a plunger 13 that can be controlled by the push button 14 which acts through a tightly coiled wire plunger 15. The inner end of tube 7 is provided with a threaded section 16 with which is operatively connected the enlarged head 17 of the tubular projection 18 which may be a solid metal tube, as shown in Figures 3 and 4, or be formed in part by a piece of flexible tubing 18a, as shown in Figures 1 and 2.

A plunger 19 extends through the tubular projection and terminates, within the hollow body member 7, in a head 20 which is preferably connected with the end of the plunger by means of threads, as indicated at 21 in Figure 2. The object of the threaded connection is to make it possible to adjust, or change the distance from the head to the end of the plunger, which is sometimes necessary in order to obtain the synchronous operation necessary for the best results.

The diameter of the head 20 is slightly less than the interior diameter of the tube 7 so that it will be guided by the tube but will move freely within the same. A helical spring 22 surrounds the plunger 19, between the head 20 and the end of the tubular projection, as shown most clearly in Figures 2 and 4, and serves to hold the head in contact with the plunger 13 and to hold the plunger 19 out of contact with the trigger 6.

The inner end of the tubular member has a threaded section 23 by means of which connection can be made with the threaded opening in wall 5 from which the cable release 12 has been removed.

In Figures 3 and 4 a switch contact comprising a flexible tongue 24, which forms a part of the metal strip 25, is attached to the tube 7 by means of screws 26. The tongue 24 projects into the interior of the tube 7 so as to lie in the path of the head 20 and will be brought into electrical contact with the head when the latter is moved inwardly by the action of the plunger 13.

In the embodiment illustrated in Figures 1 and 2 the switch contact 24 is part of a ring 27 that surrounds the tube 7 and is slidable therealong.

Extending radially from the flange of cap 9 is a bracket 28 provided with a bearing in which is journalled a screw 29; this screw has a collar 30 and a knurled head 31 by means of which it can be rotated. Ring 27 is also provided with a bracket 32 which has a threaded opening with which the screw cooperates. Lock nuts 33 are provided for holding the screw from accidental rotation. Although two lock nuts have been shown it may be possible to dispense with one of them.

A flash-light 34 and a battery 35 are connected in series between the switch contact 24 and the tubular projection and whenever the head comes into contact with the switch contact the circuit will be closed and the flashlight made to function.

The shutter release and the switch for controlling the flash-lamp must be carefully synchronized so as to obtain the "flash" when the shutter is wide open, and since the elements of time are very small, such adjustment requires great care.

The tubular projection 18 is first threaded into the opening in the wall 5 and then the hollow member 7 is turned so as to get the necessary clearance between the plunger 19 and the trigger 6.

Plunger 19 is now moved inwardly until the shutter releases and the position of the head relative to the switch contact 24 noted, and if the embodiment illustrated in Figures 3 and 4 is used, the tube 7 is rotated on the threaded head 17 until an adjustment is obtained in which the switch closes at the moment that the shutter opens or at such time that the flash will take place while the shutter is fully open. After the proper adjustments have been made the parts are clamped in adjusted position by the set screw 36 which is connected with ring 37 and provided for this purpose.

In making the adjustments a minature incandescent lamp can be substituted for the flash-lamp and later removed. Where more delicate adjustments are to be made the construction illustrated in Figures 1 and 2, or some equivalent construction can be employed.

When the construction illustrated in Figures 1 and 2 is employed the rough adjustment is made by rotating tube 7 on head 17 after which the finer adjustments are made by rotating the screw 29. It has previously been pointed out that the head 20 can be turned on the plunger 19 so as to adjust the distance between the head and the end of the plunger, and it will therefore be seen that there are three adjustments.

By rotating tube 7 on the head 17 the distance from the head to the inner end of the tubular projection can be changed; by operating the screw 29 the distance from the head to the switch contact can be altered and by turning the head 20 on the plunger 19 the distance from the head to the end of this plunger can be changed. Each one of the three adjustments performs a definite function and all three may be required in obtaining the best operation.

In Figures 1 and 2 the tubular projection 18a has been shown as flexible; the reason of this is that it is sometimes impossible to make the attachment to some cameras with a straight tubular projection like that shown in Figures 3 and 4. Since the flexure is not required to be very large, the flexibility of this member does not have to be very great and plunger 19 can still be made from a brass or steel wire.

Attention is called to the fact that this attachment does not require any change in the camera and can be quickly attached because it screws right into the same hole that the camera release occupied and the latter can be made part of the attachment.

The contact adjusting means shown in Figures 1 and 2 is intended to illustrate means for adjusting the position of the contact 24 but specifically different means which perform the same function in substantially the same way can be substituted if desired.

The longitudinal opening in the hollow member 7 is of great service in making adjustments as it makes it possible to see the position of the head relative to the contact at the moment the shutter is released and this enables the operator to make the adjustments more readily and accurately than would be possible if the hollow member were solid. For the purpose of facilitating the adjustment, the hole can be of any shape, and so long as it is of a size permitting inspection of the interior of tube 17, its function will not be impaired.

It is to be understood that the single contact 24 may be changed to two spring contacts, each of which is connected to a pole of an electric circuit and suitable insulation may be provided between these contacts. The head 20 may be employed as a pressure member to move one contact into engagement with the other, or it may be used to bridge the gap between the contacts and thereby close the circuit.

These and other changes and modifications may be resorted to within the spirit and scope of the invention as defined in the hereunto appended claims.

After the device is attached to the casing of the camera and the several adjustments have been made to synchronize the operations of the flash and the shutter, as hereinabove described, the operation consists in pressing the push button 14 thereby causing the contact 20 to move into engagement with the relatively stationary contact 24, through the instrumentality of the "plungers" 13 and 15.

The movement of the contact 20 also causes lengthwise movement of the "plunger" 19 against the resistance of the spring 22, with the result that the trigger 6 of the shutter-mechanism is actuated at the same time that the engagement of the two contacts closes the circuit of the illuminant.

Having described the invention, what is claimed as new is:

1. A device for timing the operation of a camera-shutter with that of an illuminant, comprising a circuit, an illuminant in the circuit, a circuit-controlling switch including normally separated contacts one of which is movable relative to the other, the movable contact being a part of a shutter-actuating device, manual means for the operation of said device, a casing for the movable contact, having a sight-opening, a carrier for the other contact, projecting the same through the sight-opening, into the path of the movable contact, and slidable on the casing, and means to adjust the contact on the carrier in the direction of the path of the movable contact, by movement of the carrier, the two contacts being disposed relative to the casing to be visible through the opening from without the casing.

2. A device for timing the operation of a camera-shutter with that of an illuminant, comprising a circuit, an illuminant in the circuit, a circuit-controlling switch including normally separated contacts one of which is movable relative to the other, the movable contact being a part of a shutter-actuating device, manual means for the operation of said device, a casing for the movable contact, having a slot, a carrier for the other contact, projecting the same through the slot, into the path of the movable contact, and slidable on the casing, and means to adjust the contact on the carrier, in the direction of the path of the movable contact, by movement of the carrier.

EDWARD O. EISENHAND.